US008574004B1

(12) United States Patent
Tarchinski et al.

(10) Patent No.: US 8,574,004 B1
(45) Date of Patent: Nov. 5, 2013

(54) MANUAL SERVICE DISCONNECT WITH INTEGRATED PRECHARGE FUNCTION

(75) Inventors: James E. Tarchinski, Rochester Hills, MI (US); Craig A. Kollar, Sterling Heights, MI (US); Gregory G. Cesiel, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/487,834

(22) Filed: Jun. 4, 2012

(51) Int. Cl.
*H02K 33/00* (2006.01)

(52) U.S. Cl.
USPC .......................................... 439/507; 439/181

(58) Field of Classification Search
USPC .............. 439/296, 297, 507, 181; 318/37, 38; 310/24
See application file for complete search history.

(56) References Cited

U.S. PATENT DOCUMENTS

| | | | | |
|---|---|---|---|---|
| 377,237 | A * | 1/1888 | Cole | 439/507 |
| 1,819,302 | A * | 8/1931 | Rah | 218/91 |
| 3,035,242 | A * | 5/1962 | Sloop | 439/508 |
| 3,288,958 | A * | 11/1966 | Walther et al. | 200/51.12 |
| 3,627,942 | A * | 12/1971 | Bobb | 200/51.07 |
| 4,089,576 | A * | 5/1978 | Barchet | 439/507 |
| 4,510,420 | A * | 4/1985 | Sasso | 318/37 |
| 4,631,637 | A * | 12/1986 | Romania et al. | 361/788 |
| 4,846,705 | A * | 7/1989 | Brunnenmeyer | 439/78 |
| 5,106,318 | A * | 4/1992 | Endo et al. | 439/189 |
| 5,154,624 | A * | 10/1992 | Lemajeur et al. | 439/130 |
| 5,158,477 | A * | 10/1992 | Testa et al. | 439/507 |
| 5,498,902 | A * | 3/1996 | Hara | 257/686 |
| 5,562,490 | A * | 10/1996 | Rybolt et al. | 439/507 |
| 6,056,592 | A * | 5/2000 | Hashizawa et al. | 439/509 |
| 6,261,123 | B1 * | 7/2001 | Kruger et al. | 439/511 |
| 6,407,666 | B1 * | 6/2002 | Debrody et al. | 340/568.4 |
| 6,625,029 | B2 * | 9/2003 | Bernini | 361/728 |
| 6,676,424 | B2 * | 1/2004 | Ferranti et al. | 439/213 |
| 6,676,439 | B2 * | 1/2004 | Litwiller | 439/489 |
| 6,780,066 | B2 * | 8/2004 | Hasegawa et al. | 439/732 |
| 7,244,148 | B2 * | 7/2007 | Maguire et al. | 439/620.28 |
| 7,867,001 | B2 * | 1/2011 | Ambo et al. | 439/271 |
| 7,878,869 | B2 * | 2/2011 | Murano et al. | 439/792 |
| 7,883,361 | B2 * | 2/2011 | Ambo et al. | 439/507 |
| 2007/0080153 | A1 * | 4/2007 | Albrecht et al. | 219/130.01 |
| 2011/0250775 | A1 * | 10/2011 | Bies et al. | 439/296 |

* cited by examiner

*Primary Examiner* — Neil Abrams
*Assistant Examiner* — Phuong T Nguyen
(74) *Attorney, Agent, or Firm* — John A. Miller; Miller IP Group, PLC

(57) ABSTRACT

A manual service disconnect device for an electric vehicle that includes an integrated pre-charge function. The manual service disconnect device includes a rotatable body having a non-conductive handle and a conductive shaft, a first terminal, a second terminal, a third terminal, a first wire electrically coupled to the third terminal, a second wire electrically coupled to the second terminal, and a resistor electrically coupled to the first wire and the first terminal. The rotatable body is inserted so that the conductive shaft makes electrical contact between the first terminal and the second terminal so that electrical current can flow between the first wire and the second wire through the resistor and the rotated so that the conductive shaft makes electrical contact between the second terminal and the third terminal so that electrical current flows directly between the first wire and the second wire.

17 Claims, 4 Drawing Sheets

MANUAL SERVICE DISCONNECT WITH INTEGRATED PRECHARGE FUNCTION

BACKGROUND OF THE INVENTION

1. Field of the Invention

This invention relates generally to a manual service disconnect (MSD) device for electrically disconnecting a high voltage battery in an electric vehicle and, more particularly, to a manual service disconnect device for electrically disconnecting a high voltage battery in an electric vehicle, where the manual service disconnect device also provides a pre-charge function.

2. Discussion of the Related Art

The automotive industry is now experiencing a significant increase in the number of vehicles that provide some fraction of their propulsion via high voltage electrical systems. These vehicles include hybrid vehicles, such as the extended range electric vehicles (EREV) that combine a battery and a main power source, such as an internal combustion engine, fuel cell systems, etc., and electric only vehicles, such as the battery electric vehicles (BEV). All of these types of electric vehicles employ a high voltage battery that includes a number of battery cells. These batteries can be different battery types, such as lithium ion, nickel metal hydride, lead acid, etc. The battery can include individual battery modules where each battery module may include a certain number of battery cells, such as twelve cells. The individual battery cells may be electrically coupled in series, or a series of cells may be electrically coupled in parallel, where a number of cells in the module are connected in series and each module is electrically coupled to the other modules in parallel. Different vehicle designs include different battery designs that employ various trade-offs and advantages for a particular application.

In order to comply with federal requirements for high voltage safety, and for other tactical reasons, many of these types of vehicles use electrical contactors (relays) to confine high voltage to the vehicle's energy storage system (ESS) during shut-down periods and under some fault conditions, such as vehicle impacts. Particularly, the high voltage battery in an electric vehicle is selectively coupled to the vehicle's high voltage bus by battery contactors. When the vehicle is shut off, the contactors are opened and the battery is disconnected from the high voltage bus. When the vehicle is switched on, the contactors are closed and the battery voltage is coupled to the high voltage bus.

Several other high voltage components are electrically coupled to the high voltage bus, including a traction motor power inverter module (TPIM) that converts the DC high voltage bus signal to an AC signal suitable for the AC propulsion motors on the vehicle. The TPIM and other modules and circuits coupled to the high voltage bus generally include a relatively large capacitor, sometimes referred to as an X-capacitor, coupled across the positive and negative lines of the high voltage bus that filters bus voltage noise that may otherwise have a degrading effect on the performance of the module. However, as the battery contactors are being closed and the battery voltage is coupled to the high voltage bus lines, these capacitors act as a direct short across the bus lines until the capacitor has had an opportunity to charge, which is generally only a few milli-seconds. This limited time direct short has a degrading effect on many of the electrical components in the system as a result of the high voltage, including the capacitor itself and the contactors, which limits their life.

In order to eliminate or reduce this current spike from the direct short at system start-up, it is known to provide a pre-charge resistor in the battery circuit that operates as a load to limit the current while the several capacitors are being charged. In other words, the pre-charge resistor pre-charges the vehicle's high voltage bus prior to closing the main bus contactors during vehicle start-up in order to avoid high in-rush current spikes that may otherwise damage the high voltage capacitors. In one particular design, a negative battery contactor is closed at start-up and the pre-charge resistor is coupled across the positive bus contactor, which remains open until the pre-charge function is completed.

It is known in the art to provide a manual service disconnect (MSD) device in the vehicle battery circuit, which is a device that electrically disconnects and separates a high voltage battery into two parts. Service personnel can remove the MSD device when servicing the electric vehicle to reduce the possibility of coming in contact with the full high voltage of the battery. Also, the MSD device can be opened or removed by first responders after the vehicle is involved in a collision or other significant event, where the high voltage system may potentially be compromised.

The primary reason for using a contactor to perform the pre-charge function is that with current technology, it is sometimes preferable to discharge the X-capacitors after the vehicle's drive cycle is completed. In the future, however, high voltage components will presumably have less parasitic current draw and will therefore be more energy efficient to maintain the X-capacitors charged between drive cycles. Furthermore, vehicles of the future are much more likely to be connected to the power grid when they are not being driven, further reducing the likelihood that it will be required to frequently discharge the X-capacitors. Because of this, it is likely that the pre-charge function for future vehicles will need to be performed significantly less often.

SUMMARY OF THE INVENTION

In accordance with the teachings of the present invention, a manual service disconnect device for an electric vehicle is disclosed that includes an integrated pre-charge function. The manual service disconnect device includes a rotatable body having a non-conductive handle and a conductive shaft, a first terminal, a second terminal, a third terminal, a first wire electrically coupled to the third terminal, a second wire electrically coupled to the second terminal, and a resistor electrically coupled to the first wire and the first terminal. The rotatable body is inserted so that the conductive shaft makes electrical contact between the first terminal and the second terminal so that electrical current can flow between the first wire and the second wire through the resistor and so that the conductive shaft makes electrical contact between the second terminal and the third terminal so that electrical current flows directly between the first wire and the second wire. The rotatable body is rotated during the insertion operation to provide a delay for the pre-charge function.

Additional features of the present invention will become apparent from the following description and appended claims, taken in conjunction with the accompanying drawings.

DETAILED DESCRIPTION OF THE EMBODIMENTS

Figures 1, 2:
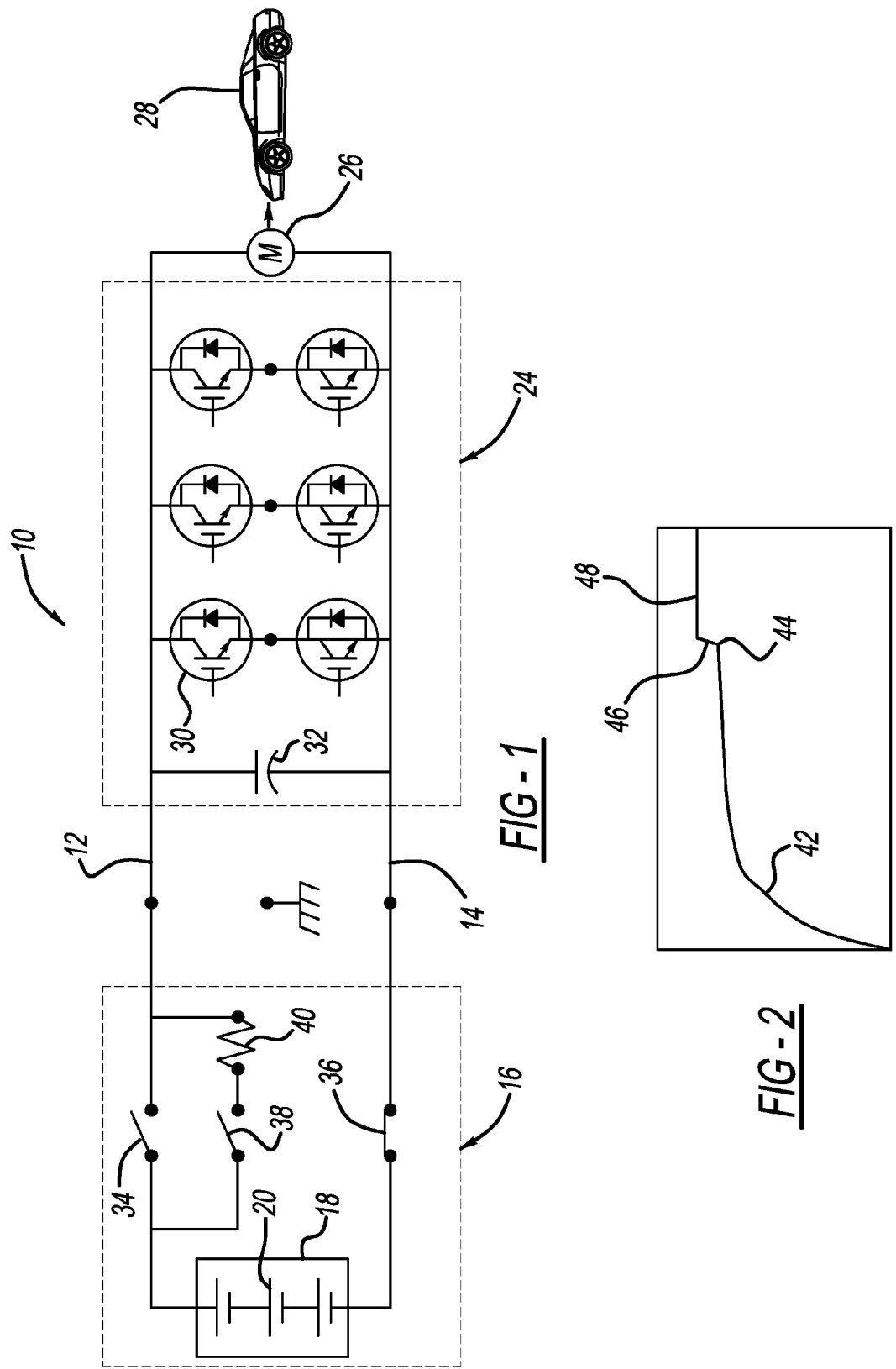
FIG. 1 is a schematic diagram of a vehicle battery circuit including a pre-charge function.
FIG. 2 is a graph with time on the horizontal axis and frequency on the vertical axis showing X-capacitor voltage over time during a pre-charge operation for the circuit shown in FIG. 1.

The following discussion of the embodiments of the invention directed to a manual service disconnect device that includes a pre-charge function is merely exemplary in nature, and is in no way intended to limit the invention or its applications or uses. For example, as discussed herein, the manual service disconnect device has particular application to be used in a high voltage battery circuit on an electric vehicle. However, as will be appreciated by those skilled in the art, the manual service disconnect device described herein may have other applications.

The present invention proposes a manual service disconnect device for an electric vehicle that includes an integral pre-charge resistor. The manual service disconnect device includes an MSD body and an MSD base where inserting the MSD body into the MSD base will couple a resistor across positive and negative terminals allowing the battery circuit to pre-charge. The MSD body needs to be manually twisted, or some other suitable motion, to provide a 0.25 s to 1.0 s delay time to allow the system to pre-charge. At the end of twisting motion, the circuit will place a complete short across the positive and negative terminals of the MSD device.

As will be discussed in detail below, the MSD body can include a conductive metal rail supported by a non-conductive handle. Holding the handle, the user will insert the MSD body into the uniquely designed MSD base. When the body is initially inserted into the base, a low-voltage switch would be activated that initializes the vehicle's control system, which would respond to the MSD device insertion event by closing the negative main contactor in preparation for pre-charge. As the MSD body insertion progress continues, the conductive section of the MSD body simultaneously contacts two high voltage terminals. The first terminal supplies high voltage energy from the battery pack via a pre-charge resistor and the second terminal connects directly to a traction system on the vehicle. After both the first two terminals are shorted, the X-capacitor pre-charge function is initiated.

To provide time for the pre-charge function to be completed, the MSD device is designed so that it hits a hard stop that prevents further insertion motion. Once this stop is encountered, the user rotates the MSD body through a number of degrees of travel. Friction opposing the MSD body rotation is used to make certain that the full travel does not occur to quickly, thus allowing the pre-charge circuit to complete. Once the rotation is completed, the MSD body can then be fully inserted to cause second and third terminals in the MSD base to be shorted. This essentially closes the circuit between the battery pack and the vehicle traction system. This final insertion motion will also likely trigger a second sensing switch so that the vehicle control system knows the MSD device is fully in place.

To accommodate this technique of pre-charge, the pre-charge diagnostics will likely need to change from the methods currently employed. In particular, if the control system does not see the traction system voltage rise sufficiently within the shortest amount time it can take to rotate the MSD body, the control system will need to abort the pre-charge function by opening the negative rail contactor. This sequence will require the user to manually restart the pre-charge process.

The MSD device is sometimes used by first responders during vehicle emergencies. Hence, there are some benefits to an MSD device that can be quickly activated to depower the high voltage system. Because this invention provides longer insertion times to reduce the power requirements on the pre-charge resistor, a unique feature can be added to allow the MSD device to be removed quickly while still enforcing the longer insertion time.

An alternative usage of the device will be to use the MSD device as the only technique for starting the vehicle by replacing the traditional ignition switch, and hence the pre-charge is still done once per drive pre-charge cycle. To start the vehicle, the user can press down and perform the twisting process on what looks like a large switch, when it is the MSD device described herein. In this case, the MSD device would probably be completely enclosed and captive to the MSD base and stylized into the interior of the vehicle.

FIG. 1 is a schematic diagram of a vehicle circuit 10 including a high voltage bus having a positive rail 12 and a negative rail 14. The vehicle circuit 10 also includes a battery circuit 16 having a battery module 18 including battery cells 20. The battery module 18 can be any type of battery suitable for vehicle propulsion, such as lithium-ion, nickel-metal hydride, lead acid, etc. The battery circuit 16 also includes a positive rail contactor 34 in the positive rail 12 and a negative rail contactor 36 in the negative rail 14. A pre-charge switch 38 and a pre-charge resistor 40 are provided across the positive rail contactor 34 to provide the pre-charge operation as discussed above, and discussed further below. The vehicle circuit 10 also includes a TPIM 24 of the type referred to above that inverts the high DC voltage on the bus rails 12 and 14 generated by the battery module 18 to an AC signal suitable for an AC propulsion motor 26 that provides propulsion for a vehicle 28. As is well understood by those skilled in the art, a TPIM of this type typically includes a series of MOSFET or IGBT switches 30 that provide the electrical inversion. The TPIM 24 also includes an X-capacitor 32 to provide noise filtering as also discussed above.

The conventional pre-charge operation using the pre-charge switch 38 and the resistor 40 can be understood by reference to the graph shown in FIG. 2, where time is on the horizontal axis and the voltage of the X-capacitor 32 is on the vertical axis, as follows. At system start up, the negative rail contactor 36 is closed and the pre-charge switch 38 is closed to allow current to flow to the TPIM 24 through the pre-charge resistor 40, which causes the voltage across the capacitor 32 to relatively slowly rise based on the value of the resistor 40 with a delay as shown by portion 42 of the graph line. After the pre-charge delay has occurred to allow the capacitor 32 to be charged, the positive rail switch 34 is closed at time point 44 to remove the resistor 40 from the circuit, which causes a small and quick voltage increase at portion 46 of the graph line to the final voltage at portion 48 of the graph line. The pre-charge switch 38 is then opened. The pre-charge operation is performed for every drive cycle and occurs in only a few milli-seconds.

As discussed above, modern electric vehicles typically employ a manual service disconnect device that when removed electrically disconnects the high voltage battery to prevent current flow therethrough. For example, although not specifically shown in the circuit 10, the battery module 18 could include a manual service disconnect device provided between the battery cells 20, typically at the center of the battery module 18, that when removed, prevents current flow through the battery module 18. However, although the conventional design places the manual service disconnect device in the battery module itself, the operation of the manual service disconnect device would also be realized by providing the device in either the positive rail 12 or the negative rail 14. With this in mind, the present invention proposes a new design for a manual service disconnect device provided in the positive rail 12 that replaces all of the positive contactor 34, the pre-charge switch 38 and the resistor 40.

Figure 3:
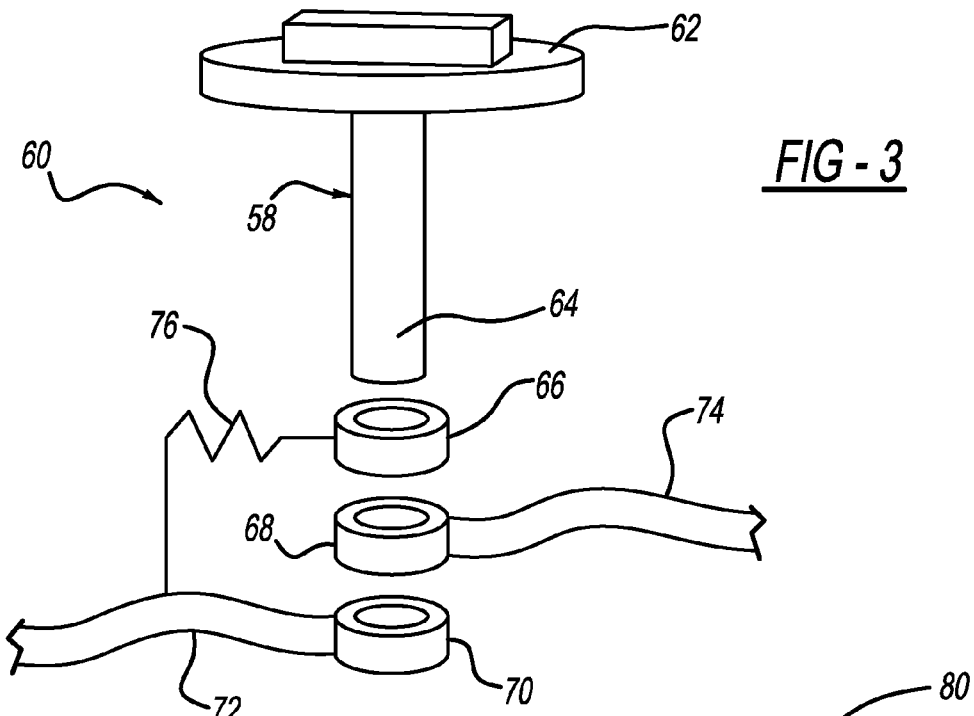
FIG. 3 is an illustration of a manual service disconnect device operable to be used in the circuit shown in FIG. 1.

FIG. 3 is an illustration of an MSD device 60 that can replace the positive rail contactor 34, the pre-charge switch 38 and the resistor 40. The MSD device 60 includes an MSD body 58 having a non-conductive handle portion 62 that the user will grasp to operate the MSD device 60, consistent with the discussion herein, and a conductive shaft 64 mounted to the handle portion 62 and providing the desired electrical contacts. The MSD device 60 also includes a top terminal 66, a middle terminal 68 and a bottom terminal 70 represented here in this non-limiting embodiment as eyelet type connectors. Circular electrical sockets that provide electrical connections of this type that are repeatable and reliable are well known to those skilled in the art. As the conductive shaft 64 is inserted into the top terminal 66 it will make electrical contact thereto, and as the shaft 64 is further advanced through the top terminal 66, it will be inserted into and make electrical contact with the middle terminal 68, and as the shaft 64 continues to be advanced it will be inserted into and make electrical contact with the lower terminal 70. A wire 72 is electrically coupled to the lower terminal 70 and could be part of the positive rail 12 that is electrically coupled to the battery module 18. A wire 74 is electrically coupled to the middle terminal 68 and also could be part of the positive rail 12 that is electrically coupled to the TPIM 24. A resistor 76 is electrically coupled to the wire 72 and the top terminal 66.

When the user advances the conductive shaft 64 through the terminal 66 to make contact with the middle terminal 68, an electrical connection is made between the wires 72 and 74 through the resistor 76. This provides the pre-charge function where the capacitor 32 is allowed to charge as discussed above. As the shaft 64 continues to be advanced and makes electrical contact with the terminal 70, the wires 72 and 74 are directly connected, where the resistor 76 no longer is part of the current flow through the MSD device 60. This connection represents closing of the positive rail contactor 34. In order to make the pre-charge operation effective in this type of design, there needs to be a suitable delay from when the shaft 64 makes contact with the middle terminal 68 to when the conductive shaft 64 makes electrical contact with the lower terminal 70 to provide enough time to allow the capacitor 32 to charge.

Figure 4:
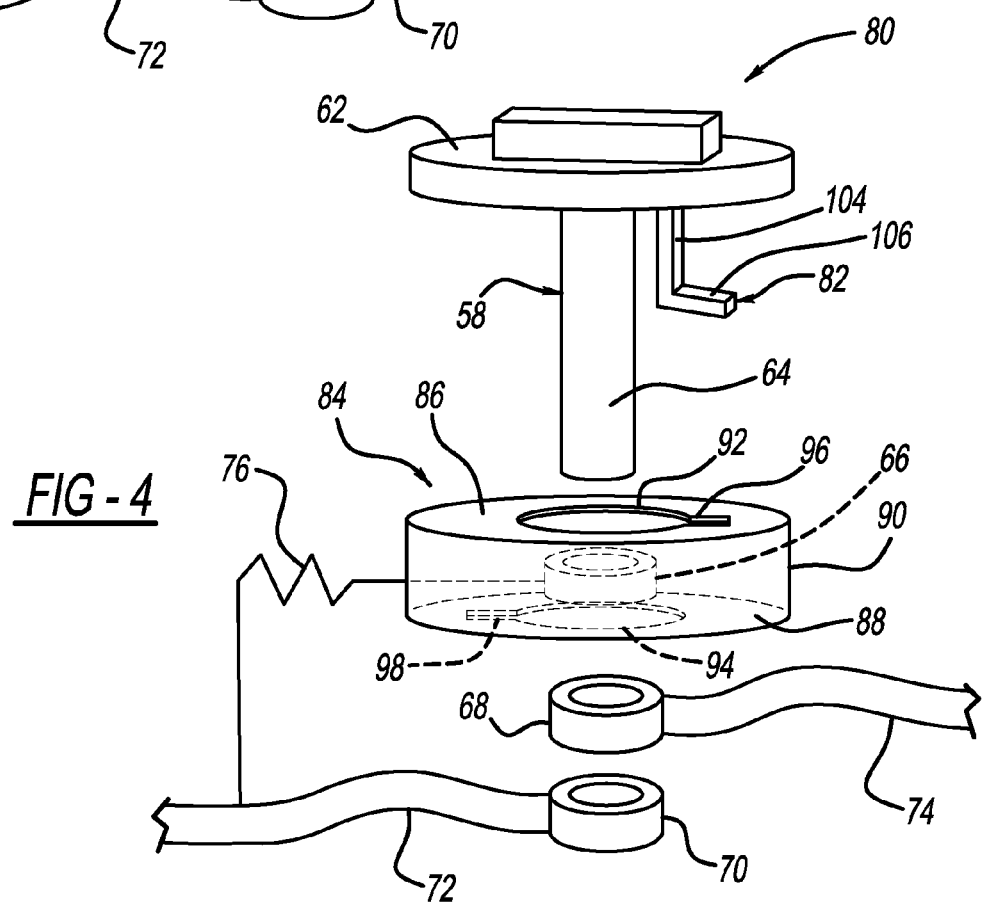
FIG. 4 is an illustration of another manual service disconnect device operable to be used in the circuit shown in FIG. 1.

FIG. 4 is a perspective type illustration of an MSD device 80 being a more detailed version of the MSD device 60, where like elements are identified by the same reference number. An L-shaped rotation and alignment element 82 is mounted to a bottom surface of the handle portion 62 and includes a vertical portion 104 extending along and spaced from the shaft 64 and a horizontal portion 106 extending away from the shaft 64, as shown. As will be discussed, the alignment element 82 is rotated within a hollow cylindrical housing 84 to provide a delay consistent with the discussion herein, where the terminal 66 is provided within the housing 84.

Figure 5:
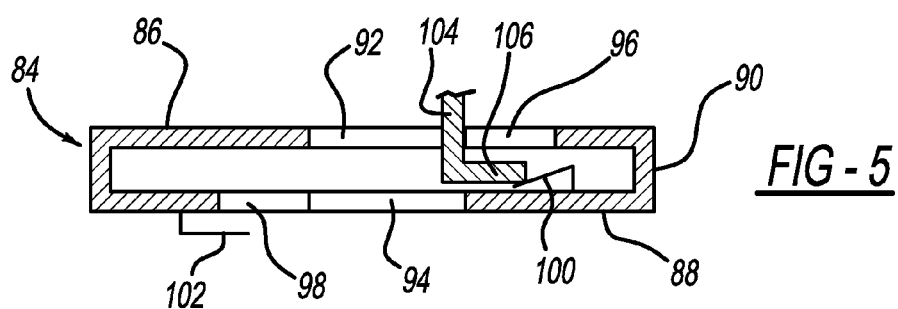
FIG. 5 is a cross-sectional view of a portion of the manual service disconnect device shown in FIG. 4.

FIG. 5 is a cross-sectional view of the housing 84 removed from the MSD device 80. The housing 84 includes a top plate 86, a bottom plate 88 and a side wall 90. A circular opening 92 is provided at the center of the top plate 86 and is aligned with a circular opening 94 provided at the center of the bottom plate 86 to allow the conductive shaft 64 to be inserted into and through the housing 84. The top plate 86 also includes a slot 96 in open communication with the opening 92 and the bottom plate 88 also includes a slot 98 in open communication within the opening 94, where the slots 96 and 98 are oriented 180° relative to each other. The openings 92 and 94 have a diameter so that the combination of the shaft 64 and the vertical portion 104 fit through the openings 92 and 94, but the extended portion 106 cannot. The size of the slots 96 and 98 are provided so that the horizontal portion 106 of the rotation element 82 can be extended therethrough.

During the operation for starting the vehicle using the circuit 10 with the MSD device 80 in place, the user inserts the conductive shaft 64 into the opening 92 in an orientation that allows the horizontal portion 106 of the element 82 to be inserted into the slot 96. As the shaft 64 advances through the opening 92 it will make electrical contact with the terminal 66 within the housing 84 and then will begin to extend through the opening 94 to make contact with the terminal 68 to provide the pre-charge connection as discussed above. The size of the terminal 66 is such that it will fit between the shaft 64 and the vertical portion 104 of the element 62. As the shaft 64 is being advanced through the housing 84, the horizontal portion 106 of the rotation element 82 will eventually contact the top surface of the bottom plate 88 within the housing 84, which will prevent the shaft 64 from further advancing and making electrical contact with the terminal 70. With the shaft 64 in this position electrically coupling the terminals 66 and 68 to provide the pre-charge connection, the user rotates the MSD body 58 via element 62 so that the rotation element 82 rotates within the housing 84 towards the slot 98. Once the horizontal element 106 is aligned with the slot 98 within the housing 84 the pre-charge operation will have had enough time to be completed, where the slot 98 allows the shaft 64 to be further advanced through the housing 84 and make electrical contact with the terminal 70 so that wire 72 is now directly connected to wire 74, effectively, removing the resistor 76 from the circuit. The time it takes to rotate the removable portion 78 to align the element 82 with the slot 98 provides the desired delay for the pre-charge operation. When the shaft 64 makes electrical contact with the terminal 70, the bottom surface of handle portion 62 will contact the top plate 86. Although the orientation of the slots 96 and 98 is 180° in this non-limiting embodiment, this orientation provides the desired delay when rotating the MSD body 58, where other orientations between the slots 96 and 98 can be provided to decrease the delay if desirable and possible. It is noted that the delay time is a design feature and would include the friction force against rotation.

The controller controlling the vehicle 28 needs to know when the pre-charge operation is initiated and when the pre-charge operation has ended to allow other operations during vehicle start-up to be controlled including closing the contactor 36. In order to provide this control logic, in one non-limiting embodiment a first limit switch 100, or some other suitable contact device, is provided within the housing 84 at the location where the horizontal portion 106 of the element 82 will contact the top surface of the bottom plate 88. When the limit switch 100 is closed, a signal is sent to the vehicle controller indicating that the pre-charge operation has commenced. A second limit switch 102 is provided relative to the slot 98 and outside of the housing 84 so that it will make contact with the horizontal portion 106 of the element 82 when the element 82 is in the position where the shaft 64 is electrically coupled to the lower terminal 70. When the limit switch 102 is closed, the vehicle controller then knows that the pre-charge operation has ended and can provide the necessary control for the other vehicle operations during vehicle start-up.

The discussion above requires that the MSD body 58 be rotated to provide the delay necessary for the pre-charge function. However, it may be necessary to remove the MSD device as quickly as possible, such as in an emergency situation. In this situation, it would not be desirable to have to rotate the MSD body 58 to remove it because of the necessity for fast removal.

Figure 6:
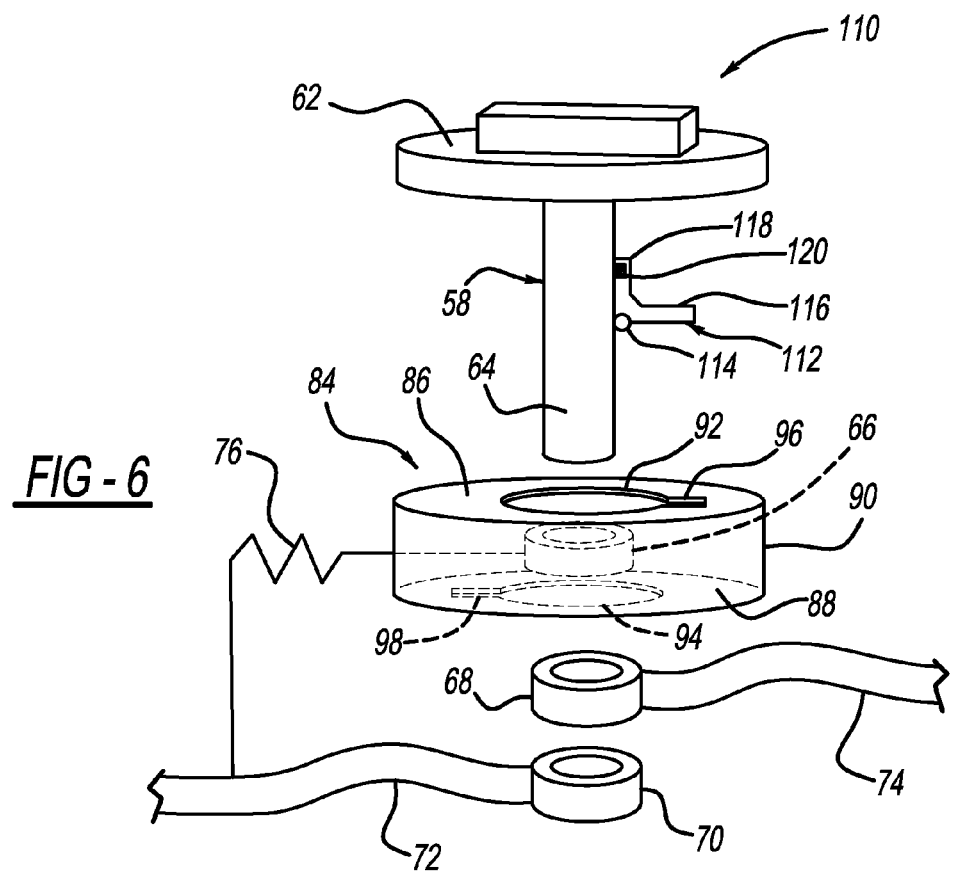
FIG. 6 is an illustration of another manual service disconnect device operable to be used in the circuit shown in FIG. 1.

FIG. 6 is an illustration of an MSD device 110, similar to the MSD devices 60 and 80, where like elements are identified by the same reference numeral, that overcomes this limitation. Particularly, the element 82 has been replaced with an L-shaped bracket 112 that is mounted to the shaft 64 at the proper location on a pivot pin 114. The L-shaped bracket 112 includes a long horizontal portion 116 extending away from the shaft 64 and a shorter vertical portion 118 positioned along the shaft 64, as shown. The MSD body 58 is inserted into the housing 84 as discussed above, where the horizontal portion 116 slides through the slot 96 and when the horizontal portion 116 of the L-shaped bracket 112 contacts the top surface of the bottom plate 88, the vertical portion 118 positioned against the shaft 64 prevents the L-shaped bracket 112 from pivoting on the pin 114. The MSD body 58 is then rotated to align the horizontal portion 116 with the slot 98 to provide the pre-charge delay as discussed above.

Figure 7:
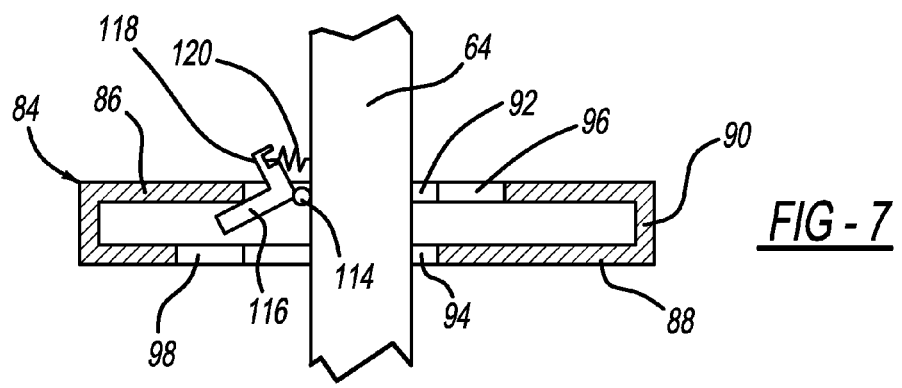
FIG. 7 is an illustration of a portion of the manual service disconnect device shown in FIG. 6 showing a bracket pivoting on a pivot pin.

If the MSD body 58 needs to be quickly removed from the vehicle to disconnect the battery module 18 during an emergency situation or otherwise when the bracket 112 has been extended through the slot 98 so that the shaft 64 makes electrical contact with the terminal 70, the responder can pull directly up on the MSD body 58, which causes the horizontal portion 116 of the bracket 112 slide back through the slot 98 and to contact the bottom surface of the top plate 86. This causes the bracket 112 to pivot on the pivot pin 114, which causes the horizontal portion 116 to pivot towards the shaft 64 and the vertical portion 118 to pivot away from the shaft 64, which allows the bracket 112 to fit through the opening 92 without a slot because the vertical portion 118 is shorter than the horizontal portion 116. FIG. 7 is an illustration showing the bracket 112 pivoting on the pivot pin 114 against the top plate 86 in this manner. A spring 120 is coupled to the shaft 64 and the vertical member 118 so that when the MSD body 58 is removed from the housing 84, the bracket 112 will return to its original position.

Figure 8:
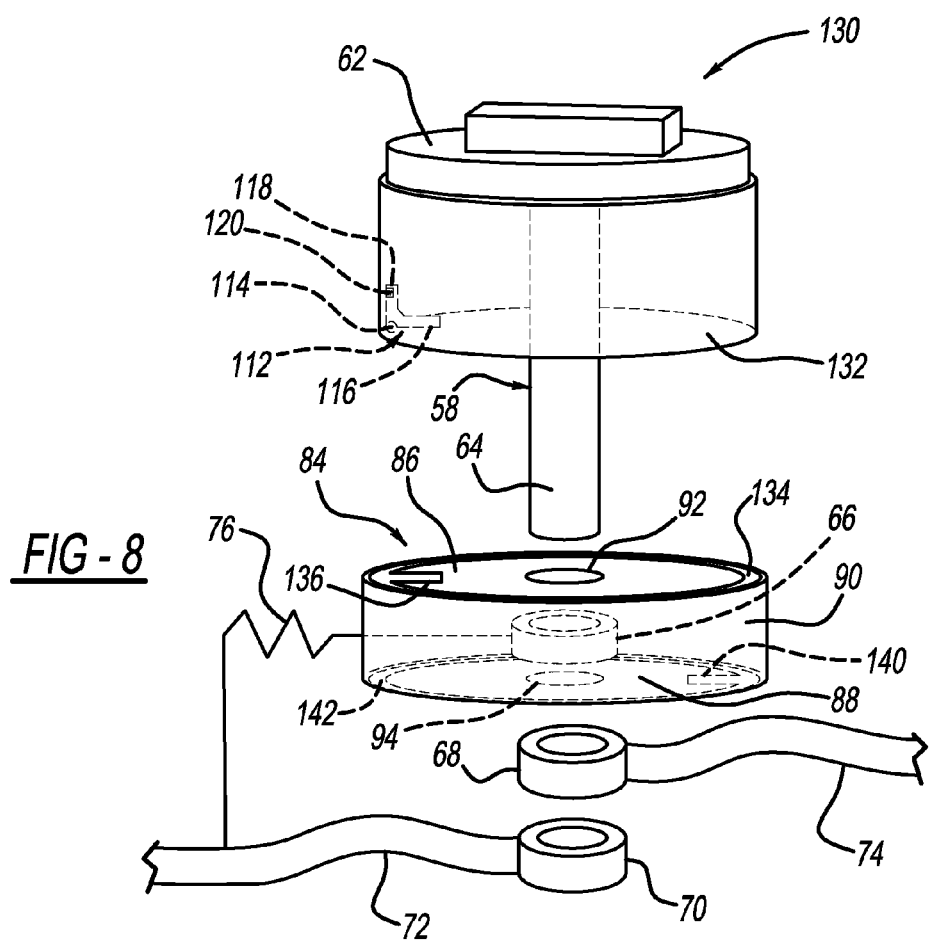
FIG. 8 is an illustration of another manual service disconnect device operable to be used in the circuit shown in FIG. 1.

FIG. 8 is a perspective view illustration of an MSD device 130 similar to the MSD device 110, where like elements are identified by the same reference number. In this embodiment, the MSD body 58 includes a non-conductive cylindrical shield 132 that is mounted to a bottom of the handle portion 62. The cylindrical shield 132 is intended to be a safety feature that protects the user from the shaft 64, which is conductive. In this embodiment, the L-shaped bracket 112 is mounted to an inside surface of the shield 132 on the pivot pin 114 instead of the shaft 64. Further, the top plate 86 is reconfigured to include a circular gap 134 extending around the entire outer perimeter of the plate 86 that has a suitable size so that when the shaft 64 is inserted into the housing 84, the shield 132 will be inserted into the housing 84 through the gap 134. Likewise, the top plate 86 includes a slot 136 extending from the gap 134 having a size to accommodate the length and width of the horizontal portion 116 of the bracket 112. The bottom plate 88 includes a slot 140 also sized and shaped to accommodate the horizontal portion 116 and being oriented 180° from the slot 136 for the reasons discussed above. A circular gap 142 is provided in the bottom plate 88 so that when the bracket 112 extends through the slot 140, the shield 132 can protrude through the bottom of the housing 84.

When the MSD body 58 is inserted into the housing 84, the L-shaped bracket 112 is aligned with the slot 136 so that it goes into the housing 84. The side wall of the shield 132 extends through the gap 134 so that the shield 132 can be slid into the housing 84 as the MSD body 58 is pushed downward. When the L-shaped bracket 112 contacts the top surface of the bottom plate 88, the body 58 is rotated 180° to allow the bracket 112 to align with the slot 140 so that the L-shaped bracket 112 can go out of the bottom of the housing 84 to allow the shaft 64 to make contact with the lower terminal 70 in the manner discussed above. The MSD body 58 can be removed straight out of the housing 84 in the manner discussed above because the dimension of the vertical portion 118 is less than the width of the gap 134.

The MSD device discussed above has a number of advantages over the current MSD devices and pre-charge circuits in the art. For example, the MSD device of the invention has fewer electrical parts, providing higher reliability and a lower cost per part. Also, the delay provided by rotating the rotatable member provides a longer pre-charge time, which allows a reduction in the size and cost of the pre-charge resistor. Further, the MSD device can be keyed differently for each vehicle to provide additional theft protection. Also, less energy is used in the drive mode because of reduced contactor coil drive. Also, if the pre-charge operation fails, the negative rail contactor can still be opened to prevent excessive current flowing when the MSD device directly shorts the battery to vehicle on the positive rail.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A manual service disconnect and pre-charge device comprising:
    a rotatable body including a non-conductive handle and a conductive shaft;
    a first terminal;
    a second terminal;
    a third terminal;
    a first wire electrically coupled to the third terminal;
    a second wire electrically coupled to the second terminal; and
    a resistor electrically coupled to the first wire and the first terminal, wherein the rotatable body is operable to be moved so as to allow the conductive shaft to make electrical contact between the first terminal and the second terminal so that electrical current can flow between the first wire and the second wire through the resistor and to allow the conductive shaft to make electrical contact between the second terminal and the third terminal so that electrical current flows directly between the first wire and the second wire.

2. The device according to claim 1 wherein the device is cylindrical.

3. The device according to claim 1 wherein the device is part of a battery circuit on an electric vehicle.

4. The device according to claim 3 wherein the first and second wires are part of a positive voltage bus in the battery circuit.

5. The device according to claim 1 further comprising a housing and an alignment element mounted to the rotatable body, said housing including spaced apart top and bottom plates and a side wall defining a chamber therein, said top and bottom plates each including a central opening and a slot, said conductive shaft being inserted into and through the openings in the top and bottom plates in an orientation where the alignment element extends into the housing through the slot in the top plate and out of the housing through the slot in the bottom plate, and wherein the slots in the top and bottom plates are oriented so that the rotatable body must be rotated after the alignment element is inserted through the slot in the top plate to allow it to be inserted through the slot in the bottom plate.

6. The device according to claim 5 wherein the alignment element is mounted to the handle.

7. The device according to claim 5 wherein the slots are oriented 180° relative to each other.

8. The device according to claim 5 where the alignment element is mounted to the shaft.

9. The device according to claim 8 wherein the alignment element is pivotally mounted to the shaft so that the element is unable to pivot upward, but is able to pivot downward to allow the shaft to be removed straight through the housing after the shaft makes electrical contact between the second and third terminals.

10. The device according to claim 5 wherein the rotatable body includes a non-conductive shield, said alignment element being mounted to an inner wall of the shield.

11. The device according to claim 10 wherein the alignment element is unable to pivot upward, but is able to pivot downward to allow the shaft to be removed straight through the housing after the shaft makes electrical contact between the second and third terminals.

12. A manual service disconnect and pre-charge device provided as part of a battery circuit on an electric vehicle, said battery circuit including a battery, said device comprising:
   a rotatable body including a non-conductive handle, a conductive shaft and an alignment element;
   a housing including a top plate, a bottom plate and a side wall defining a chamber therein, said top and bottom plates each including a central opening and a slot;
   a first terminal provided within the housing;
   a second terminal provided outside of the housing;
   a third terminal provided outside of the housing;
   a first wire electrically coupled to the third terminal and the battery;
   a second wire electrically coupled to the second terminal; and
   a resistor electrically coupled to the first wire and the first terminal, wherein the rotatable body is operable to be inserted and rotated so that the conductive shaft is inserted into the opening in the top plate in an orientation so that the alignment element extends into the housing through the slot in the top plate to make electrical contact between the first terminal and a second terminal so that electrical current can flow between the first wire and the second wire through the resistor, and wherein the rotatable body is rotated so that the alignment element aligns with the slot in the bottom plate to allow the conductive shaft to make electrical contact between the second terminal and the third terminal so that electrical current flows directly between the first wire and the second wire.

13. The device according to claim 12 wherein the alignment element is mounted to the handle.

14. The device according to claim 12 where the alignment element is mounted to the shaft.

15. The device according to claim 14 wherein the alignment element is pivotally mounted to the shaft so that the element is unable to pivot upward, but is able to pivot downward to allow the shaft to be removed straight through the housing after the shaft makes electrical contact between the second and third terminals.

16. The device according to claim 12 wherein the rotatable body includes a non-conductive shield, said alignment element being mounted to an inner wall of the shield.

17. The device according to claim 16 wherein the alignment element is unable to pivot upward, but is able to pivot downward to allow the shaft to be removed straight through the housing after the shaft makes electrical contact between the second and third terminals.

* * * * *